United States Patent [19]

Rogers, Jr.

[11] 4,359,236
[45] Nov. 16, 1982

[54] GUIDE RING ASSEMBLY FOR SEAT BELTS

[75] Inventor: Lloyd W. Rogers, Jr., Utica, Mich.

[73] Assignee: General Motors Corporation, Detroit, Mich.

[21] Appl. No.: 199,005

[22] Filed: Oct. 20, 1980

[51] Int. Cl.³ .................. B60R 21/10; A62B 35/02
[52] U.S. Cl. .................................. 280/804; 297/483
[58] Field of Search ............... 280/801, 802, 803, 804; 297/481, 483

[56] References Cited

U.S. PATENT DOCUMENTS

| | | | |
|---|---|---|---|
| 3,860,260 | 1/1975 | Kazaoka et al. | 280/803 |
| 3,959,855 | 6/1976 | Fisher | 24/163 FC |
| 4,023,826 | 5/1977 | Kokubo et al. | 297/483 |
| 4,033,594 | 7/1977 | Lindblad | 297/483 |
| 4,142,274 | 3/1979 | Scholz et al. | 24/163 R |
| 4,159,848 | 7/1979 | Manz et al. | 297/483 |

FOREIGN PATENT DOCUMENTS 2024606  1/1980  United Kingdom ............ 280/804

*Primary Examiner*—Richard A. Bertsch
*Attorney, Agent, or Firm*—Charles E. Leahy

[57] ABSTRACT

A guide ring assembly adapted to mount a seat belt on a vehicle body for longitudinal sliding movement therethrough includes an outer ring having a mounting portion by which the assembly is mounted on the vehicle body and a load bearing portion over which the belt is longitudinally slidable. The load bearing portion of the outer ring includes a generally central rectilinear segment having a length equivalent to about one width of the belt and a curvilinear segment located each side of the rectilinear segment. An inner spacer means is mounted on the mounting portion of the outer ring and includes a spacer wall which extends in parallel spaced relation from the rectilinear and curvilinear segments of the outer ring load bearing portions at a distance therefrom less than twice the thickness of the belt to define therewith a relatively narrow arcuately arranged belt passage slot. The belt may shift laterally between the central rectilinear segment and the curvilinear segments during longitudinal belt passage therethrough to accommodate a range of variation in the angle of belt departure and entry relative the mounted position of the guide ring assembly.

3 Claims, 5 Drawing Figures

GUIDE RING ASSEMBLY FOR SEAT BELTS

The invention relates to a guide ring assembly through which a seat belt is slidably movable and more particularly relates to a guide ring assembly adapted to accommodate a wide range of belt routing directions through the guide ring without binding of the belt.

BACKGROUND OF THE INVENTION

It is well known in vehicle seat belt systems to employ a guide ring through which the restraint belt is slidable. In some seat belt systems guide rings are mounted on the "B" pillar of the vehicle body to anchor the shoulder belt so that one end is routed diagonally across the occupant chest and the other end feeds into a retractor mounted on the pillar. In continuous-loop three-point belt systems having a single loop of belt, the guide ring is movable along the continuous-loop belt to define lap and shoulder belt portions of varying length. It is also known in passive belt systems to mount a guide ring on a carriage movable fore and aft along the roof rail or along the window frame of the door to permit sliding movement of the belt during movement of the belt between the occupant restraint position and a stored position permitting occupant ingress and egress.

It is desirable that the guide ring used in the above-described seat belt systems accommodate a certain range of variation in the angle of belt entry and departure relative the guide ring and that the belt be slidable longitudinally through the guide ring without folding over upon itself or twisting or binding in the guide ring.

It is well known in the prior art to mount the guide ring for pivotal movement so that the guide ring can seek a rotary position best adapted to accommodate the angular variation of belt entry and departure relative the guide ring. Scholz et al U.S. Pat. No. 4,142,274 and Lindblad U.S. Pat. No. 4,023,594 teach the provision of an auxiliary guide structure associated with the guide ring for guiding the entry or exit of the belt into the guide ring. Patents such as Scholz U.S. Pat. No. 4,142,274 and Fisher U.S. Pat. No. 3,959,855 teach that the dimension of the belt slot in the guide ring should be less than twice the belt thickness to prevent the belt from folding over upon itself.

BRIEF SUMMARY OF THE INVENTION

The present invention provides a guide ring assembly adapted to mount a seat belt on a vehicle body for longitudinal sliding movement therethrough and includes an outer ring having a mounting portion by which the assembly is mounted on the vehicle body and a load bearing portion over which the belt is longitudinally slidable. The load bearing portion includes a generally rectilinear segment having a length equivalent to about one width of the restraint belt and a curvilinear segment located each side of the central rectilinear segment. An inner spacer is mounted on the mounting portion outer ring and includes a spacer wall which extends in parallel spaced relation from the rectilinear and curvilinear segments of the outer ring load bearing portions at a distance therefrom less than twice the thickness of the seat belt to define therewith a relatively narrow arcuately extending belt passage slot. The belt may shift laterally between the central rectilinear segment and one of the curvilinear segments during longitudinal belt passage therethrough to accommodate a range of variation in the angle of belt departure and entry relative the mounted position of the guide ring assembly.

DESCRIPTION OF THE DRAWINGS

These and other features and advantages of the invention will become apparent upon consideration of the specification and appended drawings in which.

DESCRIPTION OF THE PREFERRED EMBODIMENT

Figure 1:
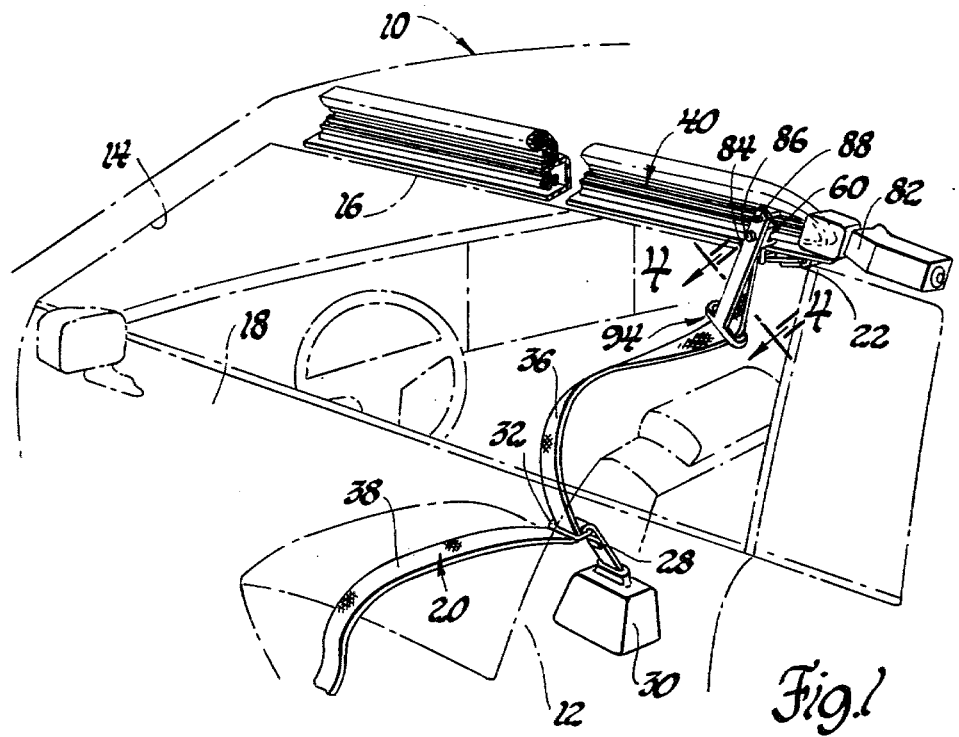
FIG. 1 is a perspective view of a passive seat belt system shown in the occupant restraint position and having the guide ring assembly of this invention.

Referring to FIG. 1 there is shown a vehicle body 10 having an occupant seat 12 located laterally adjacent a door opening defined in part by an angularly inclined windshield pillar 14 and a roof rail 16. A door 18 is hingedly mounted on the vehicle body 10 for swinging movement between the closed position shown in FIG. 1 and an open position shown in FIG. 2.

A passive occupant restraint system for restraining an occupant in the seat 12 includes a restraint belt 20 having an upper end connected to the roof rail 16 generally above and behind the door opening by an anchorage 22. The lower end of the restraint belt 20 is attached to the lower rear corner of the door by a suitable anchorage, not shown. A control belt 28 has an inboard end which is retractably mounted by a control belt retractor 30 suitably mounted on the vehicle body 10 inboard the occupant seat 12. The retractor 30 is preferably of the vehicle inertia sensitive type which is locked by a pendulum or other inertia responsive member upon occurrence of a predetermined level of vehicle deceleration. A junction ring 32 is attached to the inboard end of the control belt 28 and slidably encircles the restraint belt 20 to divide the restraint belt 20 into a shoulder belt 36 and a lap belt 38.

Figure 3:
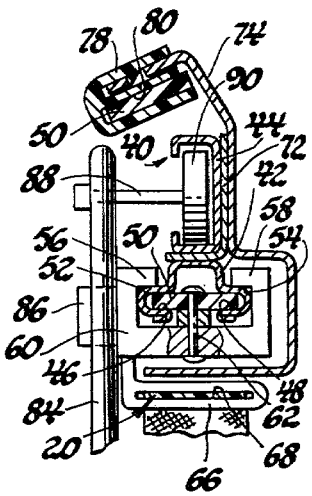
FIG. 3 is a sectional view taken in the direction of arrows 3—3 of FIG. 2 showing the arrangement of the track assembly for moving the guide ring assembly between the forward position of FIG. 2 and the rearward position of FIG. 1.

As best seen in FIG. 1, a track assembly generally indicated at 40 extends longitudinally along the roof rail 16 from the shoulder belt anchorage 22 to the windshield pillar 14. More particularly, as best seen in FIG. 3, the track assembly 40 includes a power track 42 and a cam track 44. The power track 42 is of roll formed sheet steel and defines a pair of recesses 46 and 48 which face toward each other and are adapted to slidably receive the edge portions of a flexible perforated plastic drive tape 50. The outer surface of the power track 42 provides outwardly extending ribs 52 and 54 which provide a bearing surface for inwardly extending legs 56 and 58 of a carriage 60. The carriage 60 is suitably connected to the drive tape 50 by a rivet 62. A belt guide loop 66 is mounted on the carriage 60 and has a belt slot 68 which slidably receives the restraint belt 20.

The cam track 44 of the track assembly 40 is of roll formed steel and defines a generally C-shaped channel attached to the power track 42 by a mounting bracket 72. An additional mounting bracket 74 connected to the mounting bracket 72 extends upwardly therefrom and mounts a plastic storage channel 78 which defines a storage recess 80 which slidably receives the drive tape 50. As best seen in FIG. 1, it will be understood that the track assembly 40 has a drive motor 82 associated therewith which rotates a drive gear, in mesh with the perforated drive tape 50 to displace the drive tape 50 fore and aft along the power track 42. The storage channel 78 receives and stores the major portion of the drive tape 50 when the carriage 60 is established at its rearward position of FIG. 1. When the vehicle door is opened, or upon occurrence of some other indicia of vehicle inoperativeness, the motor 82 is energized to drive the drive tape 50 forwardly along the power track 42 so that the carriage 60 is moved forwardly to the position of FIG. 2 as will be discussed in further detail hereinafter.

Figure 2:
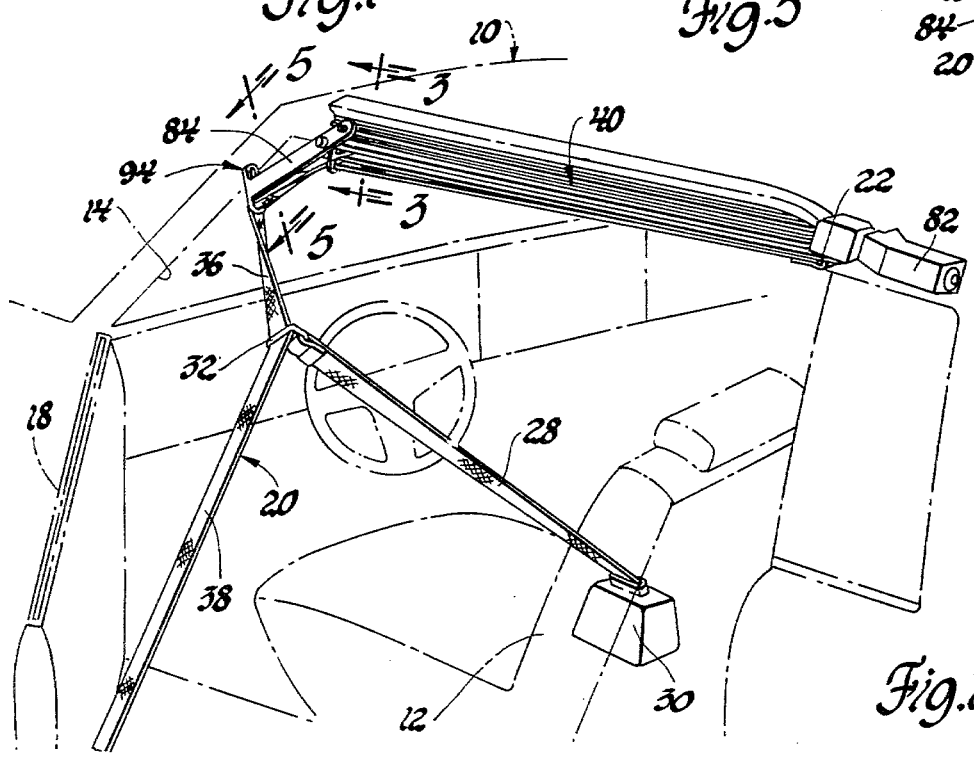
FIG. 2 is a view similar to FIG. 1 but showing the guide ring assembly having been moved forwardly and the vehicle door moved to the open position so that the belt system is in a stored position for ease of occupant entry and exit.

Referring to FIGS. 1 and 3 it is seen that a link 84 is pivotably attached to the carriage 60 by a pivot pin 86. The link 84 carries a shaft 88 which extends into the cam track 44 and mounts a cam roller 90 which is rotatably captured within the cam track 44. Referring to FIGS. 2 and 3, it will be understood that the power track 42 and cam track 44 are situated relatively close together at their forward ends so that the cam roller 90 establishes the link 84 at a forwardly pivoted position generally parallel with the windshield pillar 14 as shown in FIG. 2. On the other hand, the rearward ends of the power track 42 and cam track 44 are spaced relatively further apart so that the link 84 hangs in a more vertical position in which the shoulder belt portion 36 passes in a nearly straight line downwardly through the guide loop 66 to the control belt retractor 30.

Figure 4:
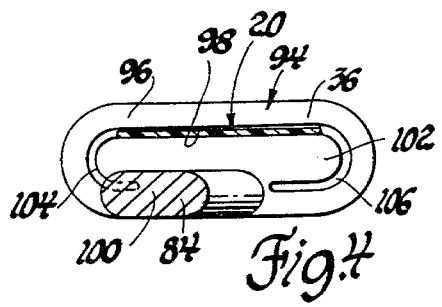
FIG. 4 is a sectional view taken in the direction of arrows 4—4 of FIG. 1 showing the belt passing through the guide ring assembly of this invention.

A guide ring assembly generally indicated at 94 is provided at the lower end of the link 84. Referring to FIG. 4, it is seen that the guide ring 94 includes a load bearing outer ring 96 of circular cross-section which defines a load bearing wall 98 over which the shoulder belt 36 is slidable. The guide ring assembly also includes a mounting portion 100 which is suitably connected to or integral with the link 84. An inner spacer element 102 is also connected with or integral with the mounting portion 100 and defines a spacer wall 104 which is spaced from the outer ring load bearing wall 98 at a distance less than twise the thickness of the shoulder belt 36. As seen in FIG. 2, the outer ring 96 and spacer element 102 are configured to include a central rectilinear segment and adjacent curvilinear segments so that the belt slot 106 defined between the load bearing wall 98 in the spacer wall 104 has a central segment which is generally rectilinear and a curvilinear segment located each side of the central rectilinear segment. The length of the central recilinear segment is approximately the same as the width of the shoulder belt 36 so that the shoulder belt 36 assumes the position of FIG. 4 in passing through the guide ring assembly when the passive belt system is established at the position of FIG. 1.

Figure 5:
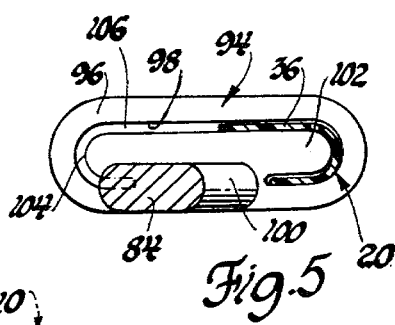
FIG. 5 is a sectional view taken in the direction of arrows 5—5 of FIG. 2 showing the guide ring assembly with the belt having moved laterally along the belt slot of the guide ring assembly to accommodate the variation in belt angle of entry and departure therefrom.

In comparing FIG. 1 with FIG. 2, it will be appreciated that forward movement of the link 84 by the track assembly 50 and the simultaneous pivotal movement of the link 84 combined with opening of the vehicle door causes a substantial variation in the angles of entry and departure of the shoulder belt 36 relative the guide ring assembly 94. FIG. 5 is a sectional view taken in the direction of arrows 5—5 of FIG. 2 to show the manner in which the curvilinear segment of belt slot 106 defined by guide ring assembly 94 permits the belt to shift curvilaterally along the load bearing wall 98 from the rectilinear segment to the curvilinear segment. The configuration of the guide ring assembly as aforedescribed promotes low friction sliding passage of the shoulder belt through the guide ring assembly 94 and prevents twisting and binding of the belt during longitudinal and pivotal movement fore and aft of the link 84 and during movement of the lap belt portion 38 with the swinging movement of the door.

Thus it is seen that the invention provides a new and improved guide ring assembly which is particularly suited to accommodate a wide range of belt routing directions in a passive seat belt environment.

While the invention has been disclosed primarily in terms of the specific embodiment shown in the drawings, it is not intended to be limited thereto but rather only to the extent set forth in the appended claims. For example, the guide ring assembly of this invention may be adapted for use in other passive seat belt environments as well as active seat belt systems.

The embodiments of the invention in which an exclusive property or privilege is claimed are defined as follows:

1. A guide ring assembly adapted to mount a seat belt on a vehicle for longitudinal sliding movement therethrough comprising:

a guide ring having a mounting portion by which the assembly is adapted to be mounted on the vehicle and a load bearing portion over which the belt is longitudinally slidable, said load bearing portion being arcuately disposed about the mounting portion and having a circumferential extent greater than the width of the belt to permit lateral shifting of the belt along the circumferential extent of the arcuate load bearing portion to thereby accommodate variation in the angle of belt departure and entry relative the mounted position of the guide loop assembly; and means mounted on the mounting portion of the guide ring and located inwardly of the load bearing portion at a closely spaced distance therefrom to prevent the belt from doubling over during longitudinal sliding or lateral shifting movement over the load bearing portion of the outer ring.

2. A guide ring assembly adapted to mount a seat belt on a vehicle for longitudinal sliding movement therethrough comprising:

an outer ring having a mounting portion by which the assembly is mounted on the vehicle and a load bearing portion over which the belt is longitudinally slidable, said load bearing portion having a length equivalent to more than the width of the belt and including a central rectilinear segment over which the belt slides during normal use and curvilinear segments located each side of the central segment to permit lateral shifting of the belt from the central segment to the curvilinear segments to thereby accommodate variation in the angle of belt departure and entry relative the mounted position of the guide ring assembly; and an inner spacer means mounted on the mounting portion of the outer ring and having a spacer wall extending in parallel spaced relation with the rectilinear and curvilinear segments of the outer ring load bearing portions at a distance therefrom less than twice the thickness of the seat belt to prevent the belt from doubling over during longitudinal sliding or lateral shifting movement over the load bearing portion of the outer ring from, to, and between the central rectilinear segment and the curvilinear segments thereof.

3. A guide ring assembly adapted to mount a seat belt on a vehicle for longitudinal sliding movement of the belt through the guide loop assembly comprising:

a ring member having a mounting portion by which the ring member is adapted for mounting on the vehicle body, said ring member having a load bearing wall and a spacer wall spaced apart from one another and defining a belt passage slot therethrough having a length substantially greater than the width of the belt, at least one endmost portion of the belt passage slot being arcuately disposed to permit curvilateral shifting movement of the belt along the load bearing wall to thereby accommodate variation in the angle of belt departure and entry relative the mounted position of the guide ring member, and said spacer wall extending in parallel spaced relation with the load bearing wall at a distance therefrom less than twice the thickness of the seat belt to prevent the seat belt from doubling over during longitudinal sliding or curvilateral shifting movement of the belt through the slot.

* * * * *